US008176566B2

(12) United States Patent
Hatano

(10) Patent No.: US 8,176,566 B2
(45) Date of Patent: May 8, 2012

(54) INFORMATION DISTRIBUTION DEVICE, METHOD AND STORAGE MEDIUM STORING PROGRAM, AND DATA SIGNAL FOR INFORMATION DISTRIBUTION PROCESSING

(75) Inventor: Yoshiaki Hatano, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1083 days.

(21) Appl. No.: 11/692,522

(22) Filed: Mar. 28, 2007

(65) Prior Publication Data

US 2008/0083020 A1  Apr. 3, 2008

(30) Foreign Application Priority Data

Sep. 28, 2006 (JP) ................................. 2006-265664

(51) Int. Cl.
*G06F 7/04* (2006.01)
*G06F 17/30* (2006.01)
*H04N 7/16* (2011.01)

(52) U.S. Cl. ......... 726/27; 358/403; 358/400; 358/1.13; 358/1.14; 358/1.15; 358/401; 726/4; 726/5; 726/22; 711/100; 711/163; 711/164; 362/100; 362/124; 438/602

(58) Field of Classification Search ...................... 726/27
See application file for complete search history.

(56) References Cited

U.S. PATENT DOCUMENTS

| 5,845,068 | A  | * | 12/1998 | Winiger ............................. 726/3 |
| 6,587,126 | B1 | * | 7/2003  | Wakai et al. ................... 715/744 |
| 2003/0159058 | A1 | * | 8/2003 | Eguchi et al. ................. 713/193 |
| 2004/0125402 | A1 | * | 7/2004 | Kanai et al. .................. 358/1.15 |
| 2005/0248803 | A1 | * | 11/2005 | Ohara ......................... 358/1.15 |
| 2006/0007500 | A1 | * | 1/2006 | Abe et al. ...................... 358/401 |

FOREIGN PATENT DOCUMENTS

| JP | 03-122715 A | 5/1991 |
| JP | 11-110158 A | 4/1999 |
| JP | 2001-014235 A | 1/2001 |
| JP | 2001-1014235 A | 1/2001 |
| JP | 2002-015215 A | 1/2002 |
| JP | 2002-033784 A | 1/2002 |
| JP | 2002-077473 A | 3/2002 |
| JP | 2003-016339 A | 1/2003 |
| JP | 2003-067299 A | 3/2003 |
| JP | 2003-140953 A | 5/2003 |
| JP | 2003-256370 A | 9/2003 |
| JP | 2004-201353 A | 7/2004 |
| JP | 2005-157478 A | 6/2005 |

* cited by examiner

*Primary Examiner* — Nathan Flynn
*Assistant Examiner* — Bryan Wright
(74) *Attorney, Agent, or Firm* — Sughrue Mion, PLLC

(57) ABSTRACT

An information distribution device including a storage section, a reception section, a selection section and a distribution section. The storage section stores, for each of predetermined distribution destinations, at least one set of output destination information representing predetermined output destinations, and security level information associated with each set of output destination information. The reception section receives electronic information and distribution destination information which represents a distribution destination of the electronic information. The selection section reads from the storage section the output destination information and security level information that correspond to the distribution destination represented by the received distribution destination information, and selects an output destination of the electronic information on the basis of the security level information. The distribution section distributes the electronic information to the selected output destination.

20 Claims, 12 Drawing Sheets

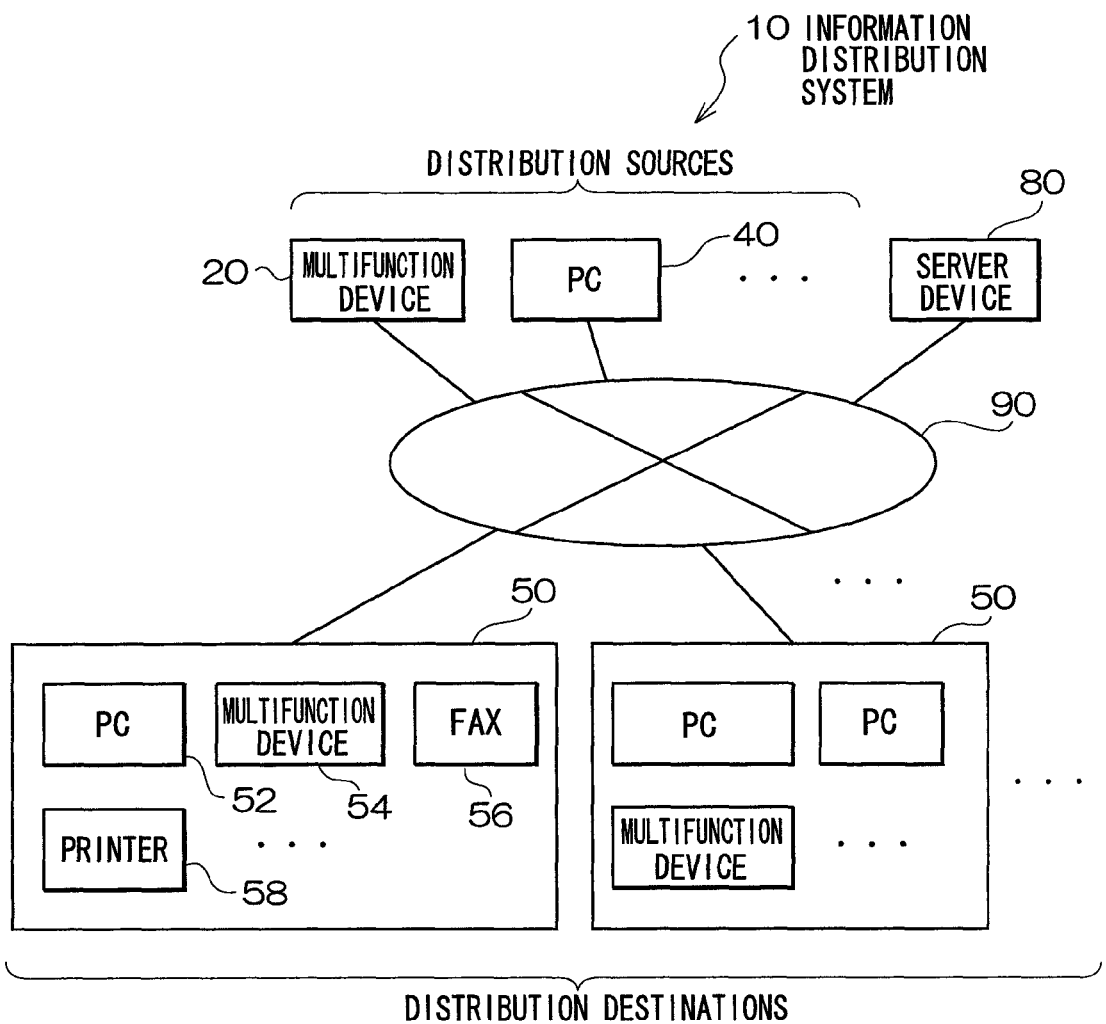

F I G. 2
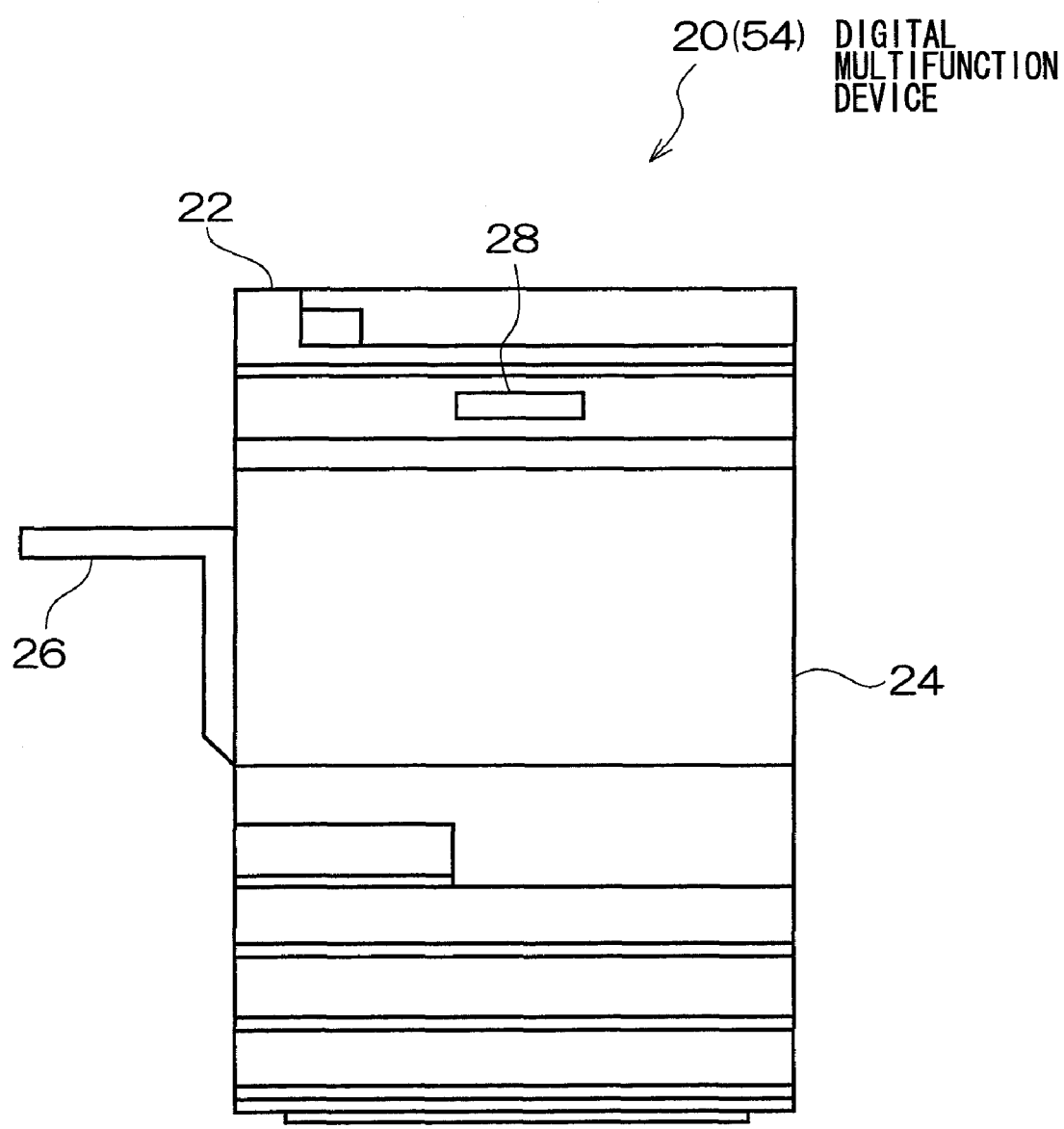

F I G. 5

DISTRIBUTION DESTINATION-RELATED INFORMATION

| DISTRIBUTION DESTINATION | OUTPUT DESTINATION | SECURITY FUNCTION | SECURITY LEVEL | OUTPUT MODE | USER REQUEST |
|---|---|---|---|---|---|
| AAA | Mail:abcdef@aaa.co.jp | S/MIME: NONE | 3 | ELECTRONIC DOCUMENT | 1 |
| | Print:129.249.99.222 | – | 4 | PAPER DOCUMENT | 3 |
| | Print:129.249.99.123 | User ID/Password | 2 | PAPER DOCUMENT | 3 |
| | FAX:03-444-5555 | BoxNo23 | 5 | PAPER DOCUMENT | 4 |
| | FAX:03-444-5556 | User ID/Password | 2 | PAPER DOCUMENT | 4 |
| | Folder. ¥¥aaa¥bb¥ccc | User ID/Password | 1 | ELECTRONIC DOCUMENT | 2 |
| | Web:portal.aaa.co.jp/seq/ | | 6 | VIEWING | – |
| BBB | ... | ... | ... | ... | ... |
| ... | | | | | |

F I G. 9
20D DISPLAY
DISTRIBUTION DESTINATION CONFIRMATION SCREEN
THIS DOCUMENT WILL BE SENT TO THE FOLLOWING OUTPUT DESTINATION. OK?
OUTPUT DESTINATION: AAA
  PRINT:129.249.99.123
SEND | SEND CANCEL
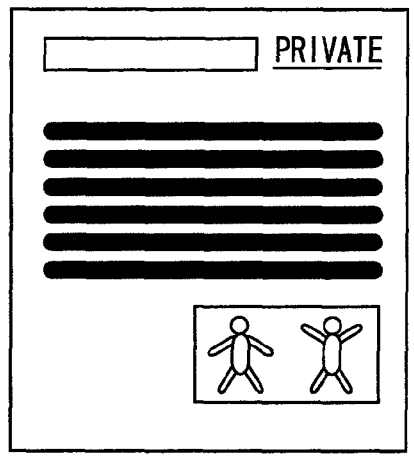

F I G. 1 1
COPY EXECUTION INFORMATION
THE IMAGE TO THE RIGHT
HAS BEEN COPIED AT AAA.
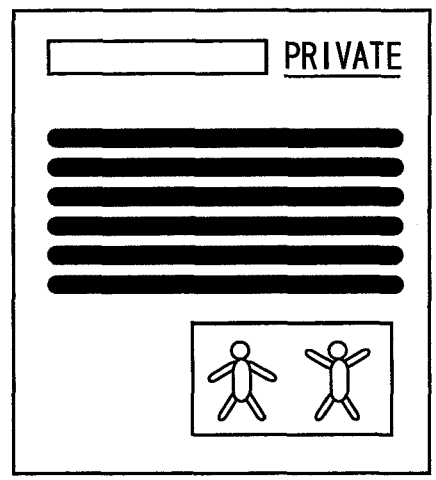

FIG. 12

HISTORY INFORMATION

| COPYING DEVICE: XXXX |
| --- |
| NUMBER OF COPIES: NN |
| COPY DATE/TIME: 2006, MM, DD/hh:mm:ss |

| SECURITY LEVEL | KEY INFORMATION |
| --- | --- |
| A | IMAGE SUCH AS 'CONFIDENTIAL', 'DO NOT COPY', 'PRIVATE', COMPANY LOGO, ETC. |
| B | TEXT STRINGS SUCH AS "CONFIDENTIAL", "DO NOT COPY", "PRIVATE", "STRICTLY PRIVATE", ETC. |
| C | TEXT STRINGS SUCH AS CODE NAMES OF PRODUCTS IN DEVELOPMENT, PERSONAL INFORMATION (ADDRESSES, NAMES, TELEPHONE NUMBERS, BIRTH DATES, ETC.) ETC. |
| D | TEXT STRINGS SPECIFIED BY USERS |

INFORMATION DISTRIBUTION DEVICE, METHOD AND STORAGE MEDIUM STORING PROGRAM, AND DATA SIGNAL FOR INFORMATION DISTRIBUTION PROCESSING

CROSS-REFERENCE TO RELATED APPLICATIONS

This application is based on and claims priority under 35 USC 119 from Japanese patent application No. 2006-265664 filed Sep. 28, 2006.

BACKGROUND

1. Technical Field

The present invention relates to an information distribution device, an information distribution method, a non-transitory storage medium storing an information distribution program, and a data signal for information distribution processing.

2. Related Art

Heretofore, there are various technologies proposed in relation to distributing electronic data to other devices.

However, with previous technologies, when electronic information is to be distributed, the electronic information may be distributed along distribution paths which are not secure.

SUMMARY

A first aspect of the present invention is an information distribution device including: a storage section that stores, for each of predetermined distribution destinations, at least one set of output destination information representing predetermined output destinations, and security level information associated with each set of output destination information; a reception section that receives electronic information and distribution destination information that represents a distribution destination of the electronic information; a selection section that reads from the storage section the output destination information and security level information that correspond to the distribution destination represented by the received distribution destination information, and selects an output destination of the electronic information on the basis of the security level information that has been read; and a distribution section that distributes the electronic information to the selected output destination.

BRIEF DESCRIPTION OF THE DRAWINGS

Exemplary embodiments of the present invention will be described in detail based on the following figures, wherein:

FIG. 1 is a structural diagram of an information distribution system relating to an exemplary embodiment of the present invention.

FIG. 2 is an external view showing structure of a digital multifunction device relating to the exemplary embodiment.

FIG. 5 is a schematic chart showing a data structure of distribution destination-related information relating to the exemplary embodiment.

FIG. 9 is a view showing an example of a display state of a distribution destination confirmation screen relating to the exemplary embodiment.

FIG. 11 is a schematic view showing a data structure of copy execution information relating to the exemplary embodiment.

FIG. 12 is a schematic view showing a data structure of history information relating to the exemplary embodiment.

FIG. 13 is a view providing a description of another exemplary embodiment, which is a schematic chart showing an example of key information for each of security levels of electronic information.

DETAILED DESCRIPTION

Figure 3:
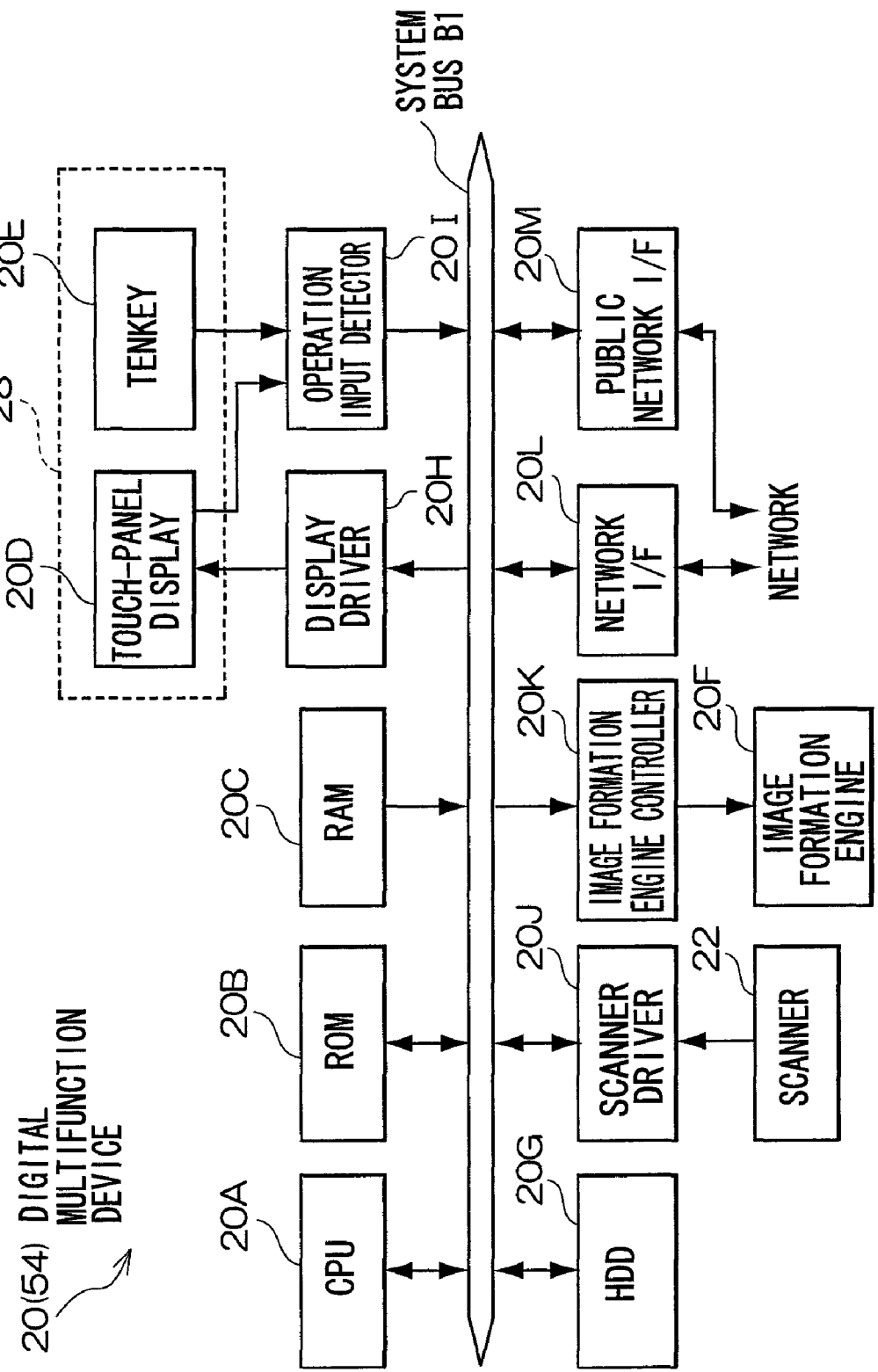
FIG. 3 is a block diagram showing structure of principal elements of an electronic system of the digital multifunction device relating to the exemplary embodiment.

Herebelow, an exemplary embodiment of the present invention will be described with reference to the drawings. Herein, the present invention will be described by a case of application to an information distribution system in which devices which act as distribution sources of electronic information and devices which act as distribution destinations of the electronic information are connected by a network.

As shown in FIG. 1, an information distribution system 10 relating to the present exemplary embodiment is provided with: electronic apparatuses such as a digital multifunction device 20, a PC (personal computer) 40 and the like which are provided at electronic information distribution sources (herebelow these are referred to as distribution source devices); electronic apparatuses such as a PC 52, a digital multifunction device 54, a facsimile 56, a printer 58 and the like which are provided at each of plural distribution destinations 50 of the electronic information (herebelow these are referred to as output destination devices); and a server device 80. These electronic apparatuses are connected to one another via a network 90 to be capable of communication.

Here, the information distribution system 10 relating to the exemplary embodiment employs the Internet as the network 90 but is not limited thus. Various networks, such as an intranet, a LAN (local area network), a VAN (value added network), a telephone wiring network, an ECHONET, a Home PNA or the like, may be employed singly or in combination. Furthermore, in order to avoid complication, the exemplary embodiment will be described with the electronic apparatuses belonging to the information distribution system 10 being fixedly assigned to be either distribution source devices or output destination devices. However, distribution source devices could also function as output destination devices, and output destination devices could also function as distribution source devices.

Next, as an example of a distribution source device relating to the exemplary embodiment, structure of the digital multifunction device 20 will be described. Firstly, structure of the exterior of the digital multifunction device 20 will be described with reference to FIG. 2.

As shown in FIG. 2, the digital multifunction device 20 includes a scanner 22, a device main body 24, an ejection section 26 and a control panel 28. The scanner 22 reads an image from a document that has been disposed at a predetermined reading position of the digital multifunction device 20, and acquires image information representing that image. The device main body 24 performs image formation processing (printing processing) on the basis of image information read by the scanner 22 and received therefrom, or printing information received and acquired from an external section, or the like. Recording paper at which an image has been formed is ejected through the ejection section 26. Various control (operation) instructions from a user are inputted at the control panel 28.

At the control panel 28 relating to the exemplary embodiment, a touch panel display (below referred to as a display) 20D and a tenkey pad 20E are provided (see FIG. 3). The display 20D displays control menus, messages and the like, and is integrally provided with a transparent-form touch panel at a screen thereof. With the display 20D, a user can input various operating instructions to the digital multifunction device 20 by touching the display screen of the display 20D with their fingers (touch operation).

In the device main body 24, an image formation engine 20F is provided, which implements printing of images on recording paper by an electrophotography system (see FIG. 3). The control panel 28 may use toner of four colors—yellow, (Y), magenta (M), cyan (C) and black (K)—to print full-color images, and may use black toner alone to print monochrome grayscale images.

Next, structure of principal elements of an electronic system of the digital multifunction device 20 will be described with reference to FIG. 3.

As shown in FIG. 3, the digital multifunction device 20 relating to the exemplary embodiment is provided with a CPU (central processing unit) 20A which manages operations of the device main body, a ROM 20B at which various programs, including a control program, and the like are pre-stored, a RAM 20C which temporarily stores various kinds of data, an HDD (hard disk drive) 20G, a display driver 20H which controls display of various kinds of information at the display 20D, and a control (operation) input detector 20I which detects controls inputted from the display 20D and the tenkey pad 20E. The HDD 20G stores various kinds of information acquired by apparatuses such as the scanner 22 and the like and received therefrom, distribution destination-related information, which will be described later (see FIG. 5), various programs including a control program, and so forth.

The CPU 20A, ROM 20B, RAM 20C, HDD 20G, display driver 20H and control input detector 20I are connected to one another via a system bus B1. Thus, the CPU 20A can respectively implement accesses to the ROM 20B, the RAM 20C and the HDD 20G and displays of various kinds of information at the display 20D via the display driver 20H, and can acquire details of instructions from users via the control input detector 20I.

The digital multifunction device 20 is also provided with a scanner driver 20J which controls optical reading of images by the scanner 22, an image formation engine controller 20K which controls operations of the image formation engine 20F, a network I/F (interface) 20L for connecting to the network 90, and a public network I/F 20M for connecting, in particular, to a telephone network of the network 90 or the like.

The scanner driver 20J, image formation engine controller 20K, network I/F 20L and public network I/F 20M are also connected to the above-mentioned system bus B1. Thus, the CPU 20A can respectively perform control of operations of the scanner 22 via the scanner driver 20J, control of operations of the image formation engine 20F via the image formation engine controller 20K, and interchange of various kinds of information with external devices via the network I/F 20L and the public network I/F 20M or the like.

Next, as an example of an output destination device relating to the exemplary embodiment, structure of principal elements of an electronic system of the PC 52 will be described with reference to FIG. 4.

Figure 4:
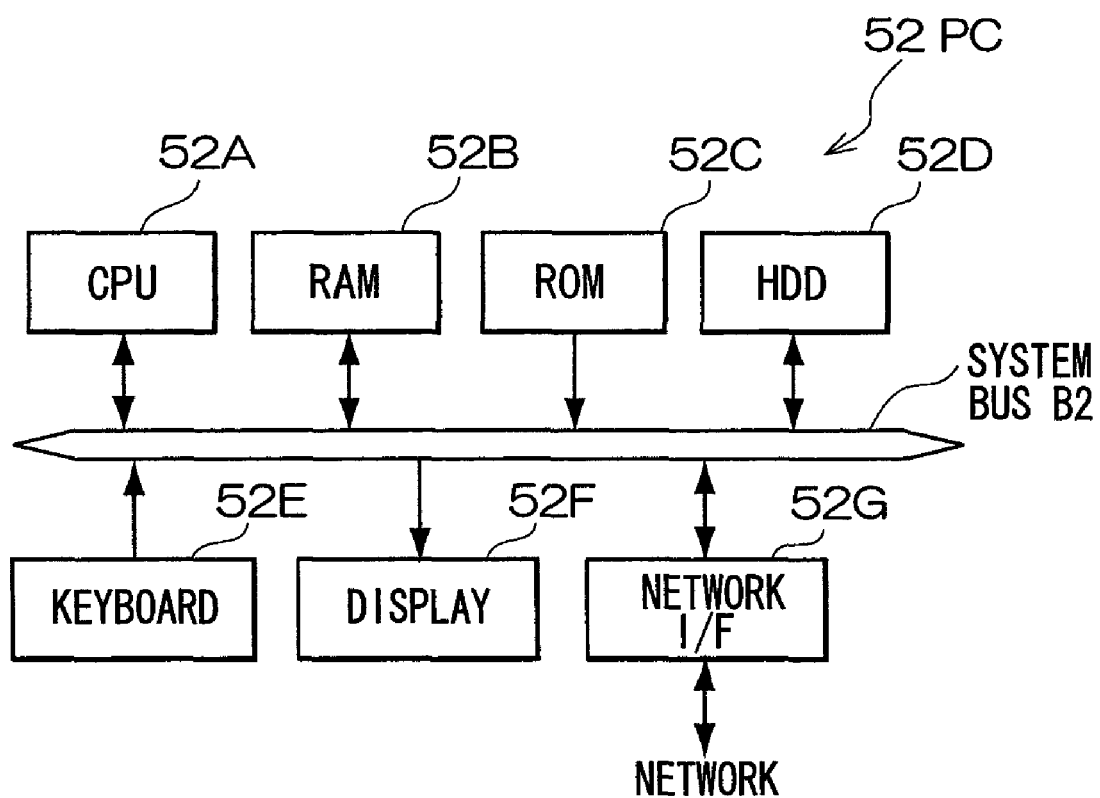
FIG. 4 is a block diagram showing structure of principal elements of an electronic system of a personal computer relating to the exemplary embodiment.

As shown in FIG. 4, the PC 52 is provided with a CPU (central processing unit) 52A which manages overall operations of the PC 52, a RAM 52B which is used as a work area at times of execution of various processing programs by the CPU 52A, a ROM 52C at which various control programs, parameters and the like are pre-stored, an HDD 52D which is used for storing various programs, including a control program, and various kinds of information and the like, a keyboard 52E which is used for inputting various kinds of information, a display 52F which is used for displaying various kinds of information, and a network I/F 52G for connecting to the network 90. These sections are connected with one another by a system bus B2.

Thus, the CPU 52A can implement accesses to the RAM 52B, ROM 52C and HDD 52D, acquisition of various kinds of input information via the keyboard 52E, display of various kinds of information at the display 52F, and interchange of various kinds of information with external devices via the network I/F 52G.

Structure of the digital multifunction device 54 that is an output destination device is the same as the structure shown in FIGS. 2 and 3, but is not limited thus.

In the information distribution system 10 relating to the exemplary embodiment, information (below referred to as distribution destination-related information) relating to the respective individual distribution destinations, of the plural predetermined distribution destinations which serve as distribution destinations of electronic information, is pre-stored at each distribution source device. Output destinations of the electronic information are selected on the basis of the distribution destination-related information, and the electronic information is distributed to the selected output destinations.

FIG. 5 schematically shows an example of a data structure of the distribution destination-related information relating to the exemplary embodiment.

As shown in FIG. 5, the distribution destination-related information relating to the exemplary embodiment is information which stores, for each of the predetermined distribution destinations, each of output destination information, security function information, security level information, output mode information, and user request information.

The above-mentioned output destination information is information representing a specific output destination (distribution destination) for the electronic information, such as a pre-supplied e-mail address, IP address, facsimile number or the like for the output destination device provided at the corresponding distribution destination. In the example shown in FIG. 5, in a case of distributing electronic information to, for example, the output destination device for which the output destination information is "mail:abcdef@aaa.co.jp", a mail protocol for that e-mail address is utilized for distribution. In a case of distributing electronic information to the output destination device for which the output destination information is "print:129.249.99.222", a printing protocol for that IP address is utilized for distribution.

The security function information is information representing functions relating to security at the corresponding output destination. For example: "S/MIME:none" means no correspondence to encoding by S/MIME; "User ID/Password" means that input of a predetermined user ID and password will be required each time the distributed electronic information is accessed (printed); and "BoxNo23" means distribution to a predetermined confidential box of an electronic apparatus such as a facsimile machine, a digital multifunction device or the like which features confidential boxes, and that the security level is relatively high.

The above-mentioned security level information is information representing a degree of security with regard to confidentiality at the corresponding output destination. In the exemplary embodiment, security is assigned numerical values ascending from '1' in a rising sequence. In the information distribution system 10 relating to the exemplary embodiment, the security level information that is employed is information representing levels in six steps from '1' to '6', but is not limited thus.

The output mode information is information representing an output mode from the corresponding output destination. For example, "Electronic document" means that the electronic information will be outputted as an electronic document, "Paper document" means that the electronic information will be outputted by printing, and "Viewing" means that the electronic information will be outputted in a viewable state at a computer.

The user request information is information which is specified by a user at the corresponding distribution destination, and represents a priority with which the output destination should be prioritized for that user. In the exemplary embodiment, the priority precedences are assigned numerical values ascending from '1' in a rising sequence.

Figure 6:
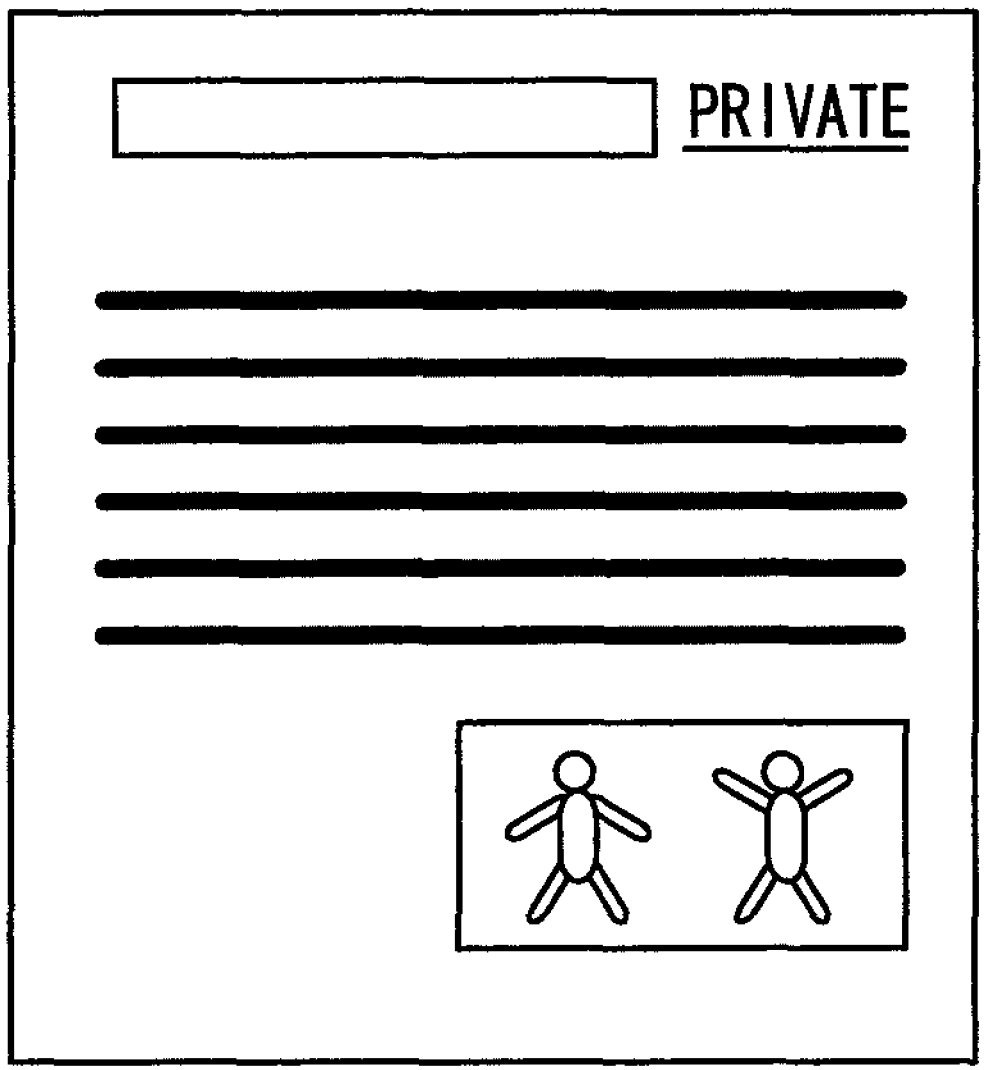
FIG. 6 is a view showing an example of a document relating to the exemplary embodiment.

Now, in the information distribution system 10 relating to the exemplary embodiment, all kinds of information which can be handled electronically can be employed as the electronic information which can be distributed, such as document image information representing an image of a document, text information of just text strings inputted from a computer, information in which such text information and image information are integrally combined, and so forth. FIG. 6 shows an example, for a case in which the above-mentioned document image information is employed as the electronic information to be distributed, a document that is represented by document image information.

Next, operation of the information distribution system 10 relating to the exemplary embodiment will be described. Here, a case in which document image information is employed as the electronic information that is to be an object of distribution and the digital multifunction device 20 is employed as a distribution source device will be described.

Figure 7:
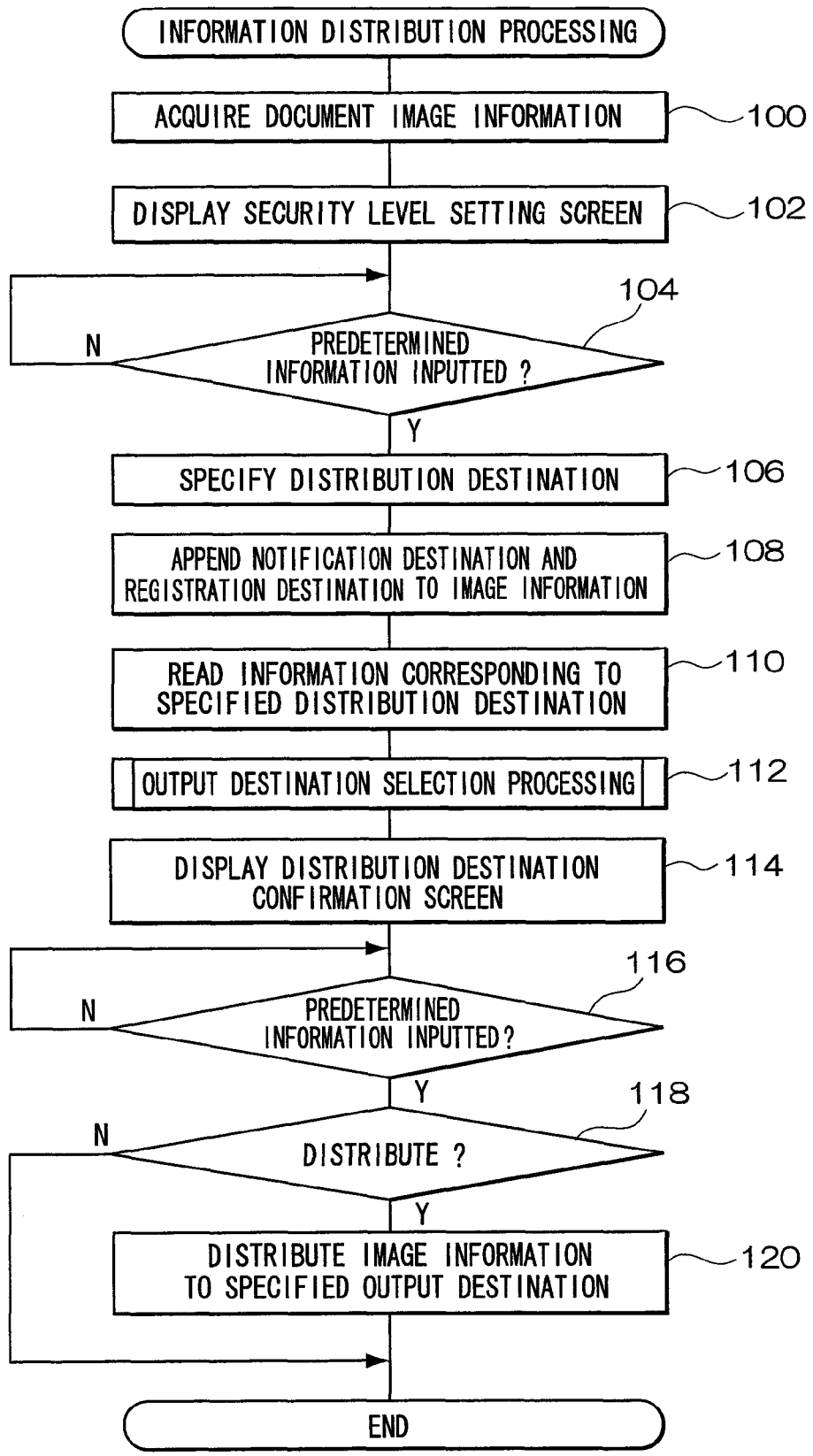
FIG. 7 is a flowchart showing a flow of processing of an information distribution processing program relating to the exemplary embodiment.

Firstly, with reference to FIG. 7, operation of the digital multifunction device 20 when the document image information is to be distributed will be described. FIG. 7 is a flowchart showing a flow of processing of an information distribution processing program which is executed by the CPU 20A of the digital multifunction device 20 when distribution of document image information has been instructed. This program is pre-stored at a predetermined region of the HDD 20G. Here, a case in which the distribution destination-related information is pre-stored at a predetermined region of the HDD 20G will be described.

A distributor of the document image information (i.e., a user of the digital multifunction device 20) places a document original which is to be the object of distribution (below referred to as a distribution object document) at a predetermined reading position of the scanner 22, and then performs an instruction for distribution of the document image information via the display 20D. In response, the CPU 20A commences execution of the information distribution processing program.

Firstly, in step 100 of the information distribution processing program, the scanner driver 20J is controlled such that an operation for reading an image is carried out by the scanner 22, and thus image information representing the distribution object document (below referred to as distribution object document information) is acquired. Then, in step 102, a predetermined security level setting screen is displayed by the display 20D, and next, in step 104, input of predetermined information is waited for.

Figure 8:
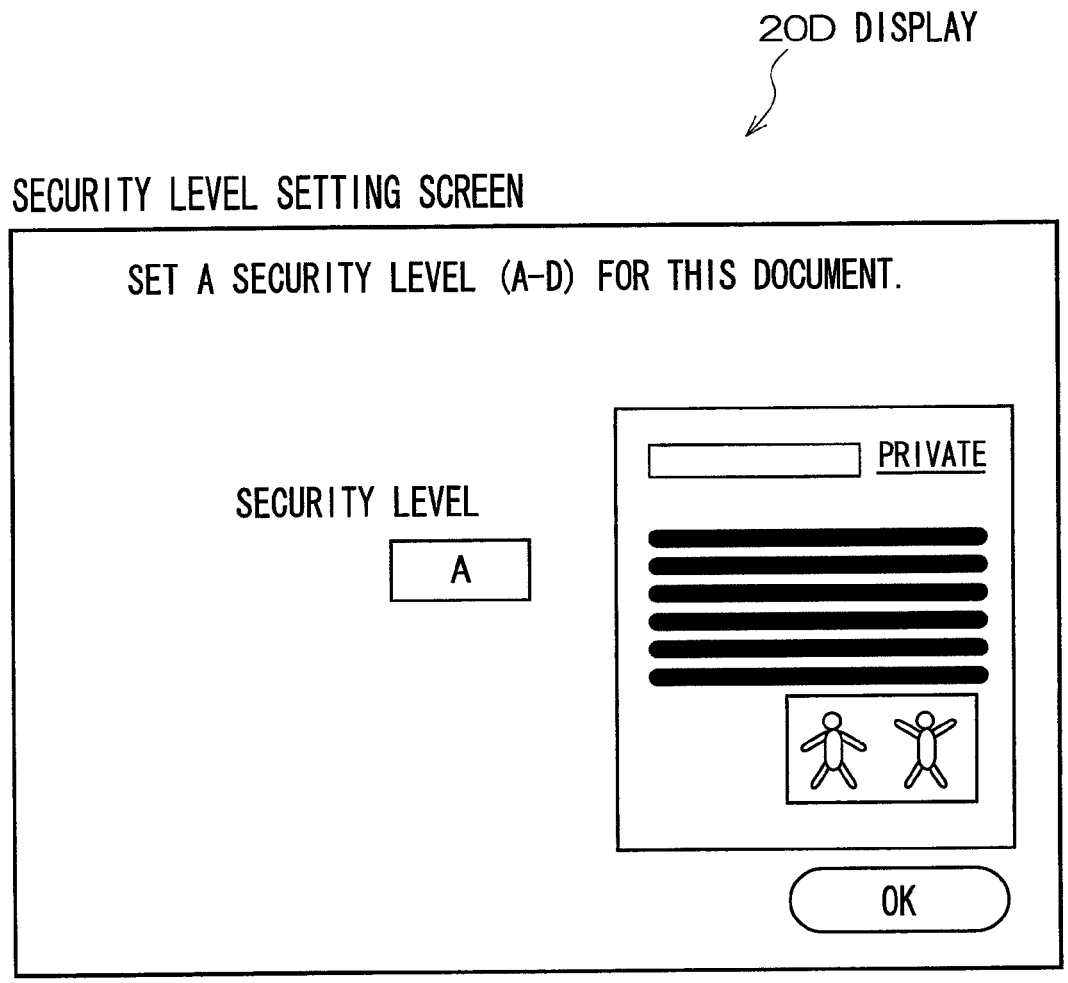
FIG. 8 is a view showing an example of a display state of a security level setting screen relating to the exemplary embodiment.

FIG. 8 shows an example of a display state of the security level setting screen that is displayed by the display 20D due to the processing of step 102. As shown in FIG. 8, in the security level setting screen relating to the exemplary embodiment, the distribution object document represented by the distribution object document information acquired by the processing of step 100 is shown in a reduced state, and a message requesting setting of a security level (confidentiality level information) for the distribution object document information and a box (a rectangular frame) for setting the security level are displayed. In the exemplary embodiment, the security level of electronic information serving as a distribution object can be set to four levels, A, B, C and D in ascending order, but this is not a limitation.

When the security level setting screen shown in FIG. 8 is displayed by the display 20D, the user designates a security level for the distribution object document in the box, and thereafter selects an 'OK' button displayed at the bottom of the screen. Accordingly, the determination of step 104 will be positive and the processing advances to step 106.

In step 106, a distribution destination of the distribution object document information is specified on the basis of the distribution object document information acquired by the processing of step 100. Here, in the information distribution system 10 relating to the exemplary embodiment, specification of the document destination is implemented by information representing the distribution destination having been printed on the distribution object document beforehand, in the form of a code image such as a QR code, a two-dimensional bar code or the like, and the code image being extracted from the acquired distribution object document information and decoded. However, this is not a limitation. Instead of the above-described code image, it is also possible to print an image of a text string representing the distribution destination on the distribution object document beforehand and apply previously known optical character recognition processing to the acquired distribution object document information, or for the user to designate the document destination, or the like.

Next, in step 108, notification destination information, which represents a notification destination, when the distribution object document represented by the distributed distribution object document information is copied at the distribution destination, of copying execution information which represents the fact of copying, and registration destination information, which represents a registration destination of history information representing a history of copying, are added to the distribution object document information. In the information distribution system 10 relating to the exemplary embodiment, the notification destination information and the registration destination information are added to the distribution object document information such that information representing the notification destination information and the registration destination information will be reproduced in the form of a code image such as a QR code, a two-dimensional barcode or the like at a predetermined region of the distribution object document represented by the distribution object document information (in the exemplary embodiment, a region at a bottom-right corner portion of the distribution object document). However, this is not a limitation. Instead of the above-described code image, it is possible to add the information such that images of text strings representing the notification destination information and the registration destination information will be reproduced.

Next, in step 110, information corresponding to the distribution destination specified by the processing of the above described step 106 is read from the distribution destination-related information that has been pre-stored in the predetermined region of the HDD 20G (see FIG. 5). Next, in step 112, output destination selection processing for setting an output destination of the distribution object document information is executed, for example, as illustrated below.

Specifically, from the distribution object document information that has been read, an output destination corresponding to a lowest security level that meets the security level of the distribution object document information, which has been acquired via the above-described security level setting screen, is selected as the output destination of the distribution object document information. In the information distribution system 10 relating to the exemplary embodiment, as described earlier, the four levels 'A' to 'D' are employed as the security levels of distribution object document information, while the six levels '1' to '6' are employed as the security levels of the output document devices. Accordingly, in the information distribution system 10: in a case in which the security level of the distribution object document information is level A, the lowest level of security levels of output destination devices that satisfies this case is '1'; in a case in which the security level of the distribution object document information is level B, the lowest level of security levels of output destination devices that satisfies this case is '3'; in a case in which the security level of the distribution object document information is level C, the lowest level of security levels of output destination devices that satisfies this case is '5'; and in a case in which the security level of the distribution object document information is level D, the lowest level of security levels of output destination devices that satisfies this case is '6'. Obviously, this is an example.

Now, there will be cases in which there are plural output destinations corresponding to the lowest security level that meets the security level of the distribution object document information. In such a case, of the plural output destinations, an output destination with the highest priority precedence as represented by the user request information is selected to be the output destination of the distribution object document information. For example, with the distribution destination-related information shown in FIG. 5, if there are two output destinations corresponding to the lowest security level that meets a security level of distribution object document information—"Print: 129.249.99.123" and "Fax:03-444-5556"—then of these output destinations, "Print:129.249.99.123" has the higher priority precedence represented by the user request information. Therefore, this output destination would be set as the output destination of the distribution object document information.

Furthermore, there will be cases in which there are no output destinations which correspond to a security level meeting the security level of the distribution object document information. In such a case, an output destination for which the output mode represented by the output mode information is "Viewing" would be forcibly set as the output destination of the distribution object document information.

Next, in step 114, a predetermined distribution destination confirmation screen is displayed by the display 20D, and next, in step 116, input of predetermined information is waited for.

FIG. 9 shows an example of a display state of the distribution destination confirmation screen that is displayed by the display 20D due to the processing of step 114. As shown in FIG. 9, a message asking whether or not the distribution object document information may be distributed to the output destination determined by the above-described processing of step 112 is displayed in the distribution destination confirmation screen. In addition, a Send button, to be selected in a case in which distribution is acceptable, and a Cancel Send button, to be selected in a case in which distribution is unacceptable, are shown.

When the distribution destination confirmation screen shown in FIG. 9 is displayed by the display 20D, a user selects the Send button if distribution is acceptable or the Cancel Send button if distribution is not acceptable, respectively. Accordingly, the determination of step 116 will be positive, and the processing advances to step 118.

In step 118, it is determined whether or not distribution of the distribution object document information has been accepted by the user in accordance with a determination of whether or not the Send button was selected in the above-described distribution destination confirmation screen. If the determination is positive, the processing advances to step 120, the distribution object document information is distributed to the output destination selected by the processing of step 112, and then the present information distribution processing program ends. Now, if an output destination for which the output mode is "Viewing" has been forcibly selected as the output destination of the distribution object document information by the output destination selection processing of step 112, in step 120, the distribution object document information is registered (output) to a server device 80 corresponding to the selected output destination ("Web:portal.aaa.co.jp/seq/" in the example shown in FIG. 5). In addition, viewing destination information (the above-mentioned "Web:portal.aaa.co.jp/seq/"), which represents a location where the registered distribution object document information can be viewed, is distributed to a device corresponding to the distribution destination. A distribution mode here may be an e-mail in which the viewing destination information is described, or the viewing destination information may be expressed as an image so as to be outputted by facsimile, printing or the like. Here, the CPU 20A carries out registration of the distribution object document information to the server device 80 such that the distribution object document represented by the distribution object document information can be viewed in accordance with verification of a predetermined password. Furthermore, in step 112, an output destination defined in the distribution destination-related information is selected as the output destination (the server device) for outputting the distribution object document information. However, this is not limiting, and it is also possible to fixedly set a pre-specified server device 80 of the information distribution system as an output destination.

On the other hand, in a case in which the determination of step 118 is negative, it is considered that the distribution of the distribution object document information is not accepted by the user, and the present information distribution processing program ends without the processing of step 120 being executed.

Figure 10:
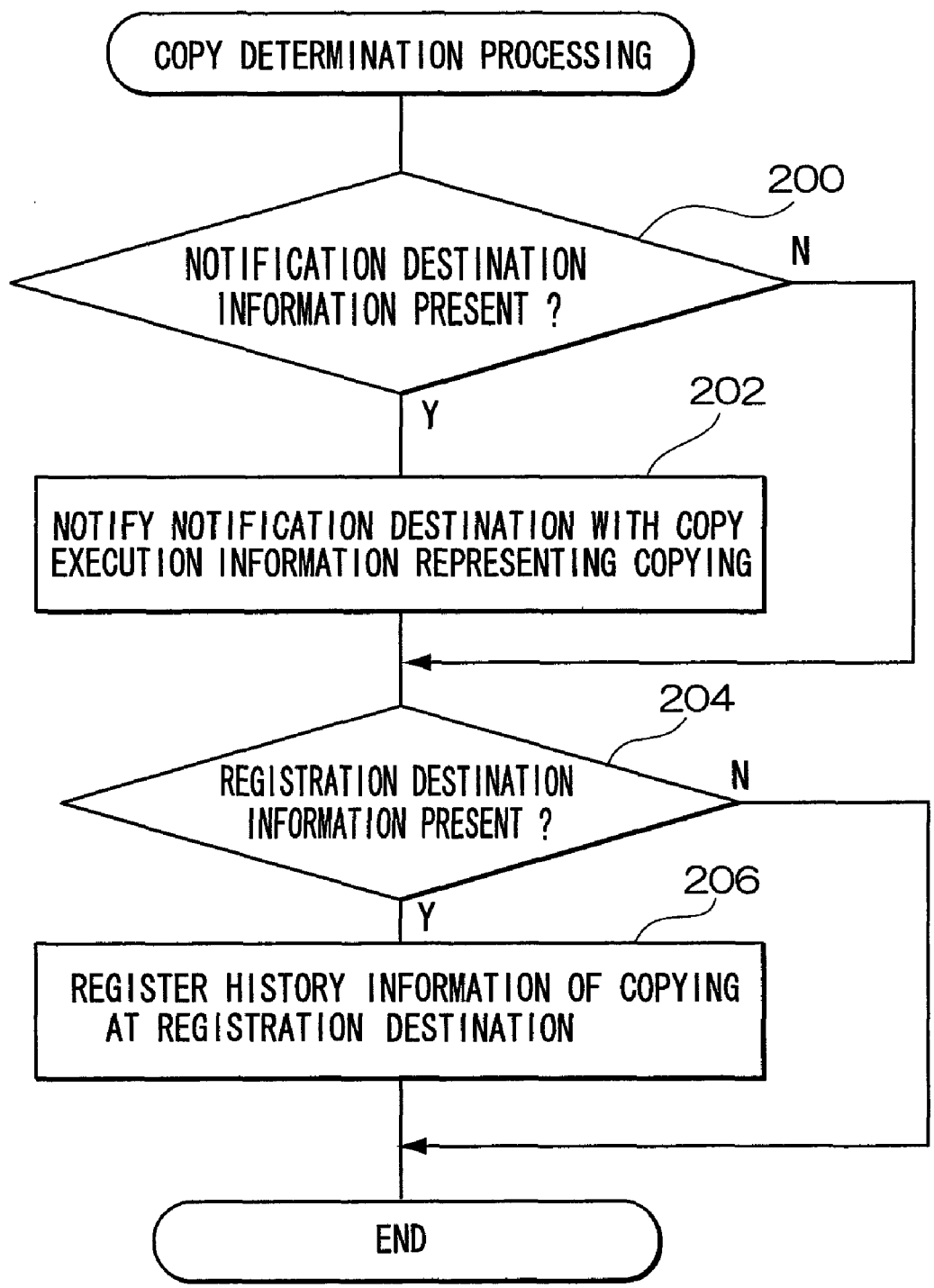
FIG. 10 is a flowchart showing a flow of processing of a copy determination processing program relating to the exemplary embodiment.

Next, copy determination processing which is executed by a device capable of copying the distribution object document represented by the distribution object document information that has been distributed, at the distribution destination of the distribution object document information, will be described with reference to FIG. 10. Here, a case in which the digital multifunction device 54 is employed as the device capable of copying the distribution object document will be described. FIG. 10 is a flowchart showing a flow of processing of a copy determination processing program which is executed by the CPU 20A of the digital multifunction device 54 when an operation for reading of an image has been carried out by the scanner 22 of the digital multifunction device 54. This program is pre-stored at a predetermined region of the HDD 20G provided at the digital multifunction device 54.

Firstly, in step 200 of FIG. 10, it is determined whether or not a code image representing notification destination information, which would have been superimposed by the processing of step 108 of the above-described information distribution processing program, is included in an image represented by image information which has been acquired by the operation of reading of an image by the scanner 22. If this determination is positive, the processing advances to step 202 and the notification destination information is acquired by decoding the code image. Predetermined copy execution information is notified to the notification destination represented by the acquired notification destination information, and then the processing advances to step 204.

FIG. 11 shows an example of information represented by the copy execution information. As shown in FIG. 11, this copy execution information is formed with the image represented by the image information acquired by the image reading operation by the scanner 22 being shown in a reduced state, and with information representing the fact of copying the image and information representing the distribution destination where the copying is carried out being shown.

Thus, the notification destination relating to the exemplary embodiment is for notification of the fact of copying of an image represented by distributed electronic information. Therefore, as the notification destination, a device which is managed by a person who would wish to be informed of the fact of copying of the image represented by the distributed electronic information may be employed (for example, the device that was the distribution source of the electronic information).

On the other hand, if the determination of the above-described step 200 is negative, the processing advances to step 204 without executing the processing of step 202.

In step 204, it is determined whether or not a code image representing registration destination information, which would have been superimposed by the processing of step 108 of the above-described information distribution processing program, is included in the image represented by the image information that has been acquired by the image-reading operation by the scanner 22. If this determination is positive, the processing advances to step 206 and the registration destination information is acquired by decoding the code image. Predetermined history information is registered to the registration destination represented by the acquired registration destination information, and then the present copy determination processing program ends.

FIG. 12 shows an example of the history information. As shown in FIG. 12, in this history information, information representing the device performing the copying (here, the digital multifunction device 54) and information of both a number of copies and a time and date of copying are registered.

Thus, the registration destination relating to the exemplary embodiment is for registration of history information representing histories of copying of images represented by distributed electronic information. Therefore, as the registration destination, a device which can be consulted by a person who would wish to be informed of details of conditions of copying each time an image represented by distributed electronic information is copied may be employed (for example, the server device 80).

On the other hand, if the determination of the above-described step 204 is negative, the present copy determination processing program ends without executing the processing of step 206.

Herein, the above-described information distribution processing program and copy determination processing program may be employed in a mode of having been provided in a pre-installed state at the digital multifunction device 20, the digital multifunction device 54 or the like, or alternatively, a mode of being distributed by wire or wireless communication means, a mode of being provided stored at a non-transitory storage medium which is readable by a computer, or the like.

Hereabove, the present invention has been described using an exemplary embodiment, but a technological scope of the present invention is not limited to the scope described for the above exemplary embodiment. Many modifications and improvements can be applied in a scope not departing from the spirit of the invention, and modes in which such modifications and improvements are applied are to be included in the technical scope of the present invention.

Furthermore, the exemplary embodiment described above is not limiting to the invention related in the claims. Moreover, the whole combination of characteristics described in the exemplary embodiment is not essential to means for achieving the invention. Various stages of the invention are included in the above-described exemplary embodiment, and various inventions can be obtained by arbitrarily combining the plural structural requirements which have been disclosed. Even if some structural requirements are eliminated from the totality of structural requirements illustrated in the exemplary embodiment, a structure from which those structural requirements have been eliminated can be obtained to serve as the invention as long as an effect is provided.

For example, for the exemplary embodiment described above, a case in which a method of input by a user is employed as a method for acquiring the security level of the distribution object document information has been described. However, the present invention is not limited thus. For example, rather than input by a user, a mode of acquisition based on the distribution object document information is possible. An example mode of such a case is described below.

As shown by an example in FIG. 13, initially, various kinds of information (below referred to as key information) which can specify security levels of the distribution object document information—such as image information representing "Confidential", "Do not copy" or a company logo, information of text strings representing keywords, and the like—are stored in advance at the HDD 20G for each security level.

Then, when the information distribution processing program (see FIG. 7) is being executed, text string information representing any of the above-mentioned text strings in the distribution object document can be acquired by applying the previously known optical character recognition processing to the distribution object document information that has been acquired by the processing of step 100.

Further, by carrying out pattern-matching, with previously known technology, between the distribution object document information and the key information that is image information, it is determined whether or not an image which matches the key information is present in the distribution object document. If such is present, a security level corresponding to that key information (level A for the example shown in FIG. 13) is specified as the security level of the distribution object document. It is also determined whether or not key information in the form of text string information is included in an extracted text string. If such is included, a security level corresponding to the key information that is determined to be included is specified as the security level of the distribution object document.

With the processing described above, there will be cases in which plural security levels are specified. In such a case, a highest security level will be applied. Moreover, in the processing described above, no security level at all may be specified. In such a case, the distribution object document information will be distributed to the output destination at the lowest security level.

Thus, the security level of the distribution object document information may be acquired without human intervention.

Further, for the exemplary embodiment described above, a case has been described in which an output destination whose security level meets the security level of the distribution object document information is selected as the output destination of the distribution object document information. However, the present invention is not limited thus. A mode is possible in which an output destination with a highest security level is set as the output destination of the distribution object document information, regardless of a security level of the distribution object document information.

Further, for the exemplary embodiment described above, a case has been described of selecting an output destination with the lowest security level that meets the security level of the distribution object document information as the output destination of the distribution object document information. However, the present invention is not limited thus. It is possible to select any output destination as the output destination of the distribution object document information, providing that output destination has a security level that meets the security level of the distribution object document information. For example, a mode is possible in which an output destination with a highest priority precedence as represented by the user request information, which satisfies the security level of the distribution object document information, is selected as the output destination of the distribution object document information.

Further, for the exemplary embodiment described above, a case has been described in which the digital multifunction device 20 is employed as an information distribution device of the present invention and the digital multifunction device 54 is employed as a copying device of the present invention. However, the present invention is not limited thus. It is possible to employ any electronic apparatus featuring functionality for distributing electronic information as an information distribution device of the present invention, an example being the PC 40 or the like. Moreover, obviously, it is possible to employ any electronic apparatus that features functionality for copying an image represented by electronic information and that features functionality for transmitting copy execution information and history information as a copying device of the present invention, an example being the facsimile 56 or the like. Also in such cases, the same effects as in the exemplary embodiment described above can be realized.

Further, in the exemplary embodiment described above, a case in which the HDD 20G is employed as a storage section of the present invention has been described. However, the present invention is not limited thus. For example, modes are also possible which employ a semiconductor memory device such as a RAM, an EEPROM, a flash EEPROM or the like, a portable memory device such as a SMART MEDIA (registered trademark), a flexible disk or the like, an external non-transitory recording medium provided at a server computer connected to a network or the like, or the like. In such cases too, the same effects as in the exemplary embodiment described above can be realized.

Additionally, structures of the information distribution system 10, the digital multifunction device 20 (and 54) and the PC 52 illustrated in the exemplary embodiment described above (see FIGS. 1 to 4) are examples. Obviously, structural elements may be added as required and unnecessary structural elements may be removed.

Further, the data structures of the distribution destination-related information, the copy execution information and the history information illustrated in the exemplary embodiment described above (see FIGS. 5, 11 and 12) are also examples. Obviously, data may be added as necessary and unnecessary data may be removed.

Further, the flows of processing of the information distribution processing program and the copy determination processing program illustrated in the exemplary embodiment described above (see FIGS. 7 and 10) are also examples. Obviously, processing sequences may be altered as necessary, details of processing may be changed, and unnecessary processing may be eliminated.

Further, the display states of the various display screens illustrated in the exemplary embodiment described above (see FIGS. 8 and 9) are also examples. Obviously, display items may be added as necessary, and unnecessary display items may be removed.

Furthermore, the exemplary embodiment described above has been described with information distribution programs being stored at electronic apparatuses such as the digital multifunction device 20, the PC (personal computer) 40 and the like which are provided at distribution sources of electronic information. However, it is also possible to provide a mode in which the programs are stored on storage media such as CD-ROMs, DVD-ROMs and the like, and/or a mode in which the programs are implemented in a data signal embodied in a carrier wave.

What is claimed is:

1. An information distribution device comprising:
   a reception section that receives:
   an electronic distribution object document which is to be distributed to one of a plurality of distribution destinations,
   distribution destination information that represents the one of the distribution destinations to which the distribution object document is to be distributed, and
   confidentiality level information representing a level of confidentiality of the distribution object document;
   a storage section that stores, for each of the distribution destinations:
   plural sets of output destination information, each set of output destination information representing one of plural output destinations at a respective one of the distribution destinations,
   wherein the output destinations include a plurality of output destinations using different communication protocols and different corresponding output modes; and
   security level information associated with each respective one of the output destinations,
   wherein the security level information represents a security level of an output document device at the respective one of the output destinations;
   a selection section that: reads, from the storage section, the plural sets of output destination information and the security level information associated with each respective one of the output destinations that correspond to the one of the distribution destinations represented by the received distribution destination information, and selects, from the read security level information and the received confidentiality level information, an output document device, at a respective one of the output destinations, having a security level that meets the level of confidentiality of the distribution object document; and
a distribution section that distributes the distribution object document to the selected output document device in an output mode corresponding to the communication protocol used by the selected output destination.

2. The information distribution device of claim 1 wherein, using the read security level information, the selection section selects, from the output destinations represented by the read plural sets of output destination information, an output document device, at a respective one of the output destinations, having a highest security level that meets the confidentiality level of the distribution object document, to be the selected output document device.

3. The information distribution device of claim 1, wherein the selection section selects, from output document devices at a respective one of the output destinations having a security level that meets the confidentiality level of the distribution object document, an output document device having a highest priority precedence, as set by a user request, to be the selected output document device.

4. The information distribution device of claim 1 wherein, if there is no output document device that meets the level of confidentiality of the distribution object document, then:
the selection section selects a server device to be the selected output document device, and
the distribution section distributes the distribution object document to the server device to be viewable thereat, and distributes viewing destination information representing a location where the distributed distribution object document can be viewed to the one of the distribution destinations represented by the received distribution destination information.

5. The information distribution device of claim 4 wherein, the distribution section distributes the distribution object document to the server device, so as to be viewable in accordance with verification of password information.

6. The information distribution device of claim 1, wherein the distribution section distributes the distribution object document to the selected output document device in a state in which at least one of the following is added to the distribution object document:
notification destination information representing, if information represented by the distribution object document is being copied, a notification destination to which information for notifying that the copying execution is sent; and
registration destination information representing a registration destination for history information that represents a history of the copying.

7. The information distribution device of claim 1, wherein the confidentiality level information is inputted by a user.

8. The information distribution device of claim 1, wherein information representing the confidentiality level information is added to the distribution object document.

9. An information distribution method comprising:
receiving:
an electronic distribution object document which is to be distributed to one of a plurality of distribution destinations,
distribution destination information that represents the one of the distribution destinations to which the distribution object document is to be distributed, and
confidentiality level information representing a level of confidentiality of the distribution object document;
storing in advance, for each of the distribution destinations:
plural sets of output destination information, each set of output destination information representing one of plural output destinations at the respective one of the distribution destinations,
wherein the output destinations include a plurality of output destinations using different communication protocols and different corresponding output modes; and
security level information associated with each respective one of the output destinations;
wherein the security level information represents a security level of an output document device at the respective one of the output destinations;
reading the plural sets of output destination information and the security level information associated with each respective one of the output destinations that correspond to the one of the distribution destinations represented by the received distribution destination information;
selecting, from the read security level information and the received confidentiality level information, an output document device, at a respective one of the output destinations, having a security level that meets the level of confidentiality of the distribution object document; and
distributing the distribution object document to the selected output document device in an output mode corresponding to the communication protocol used by the selected output destination.

10. A non-transitory computer-readable storage medium storing an information distribution program that is executable by a computer to perform a processing comprising:
receiving:
an electronic distribution object document which is to be distributed to one of a plurality of distribution destinations,
distribution destination information that represents the one of the distribution destinations to which the distribution object document is to be distributed, and
confidentiality level information representing a level of confidentiality of the distribution object document;
storing, at a storage section, for each of the distribution destinations:
plural sets of output destination information, each set of output destination information representing one of plural output destinations at the respective one of the distribution destinations,
wherein the output destinations include a plurality of output destinations using different communication protocols and different corresponding output modes; and
security level information associated with each respective one of the output destinations,
wherein the security level information represents a security level of an output document device at the respective one of the output destinations;
reading, from the storage section, the plural sets of output destination information and the security level information associated with each respective one of the output destinations that correspond to the one of the distribution destinations represented by the received distribution destination information;
selecting, from the read security level information and the received confidentiality level information, an output document device, at a respective one of the output destinations, having a security level that meets the level of confidentiality of the distribution object document; and distributing the distribution object document to the selected output document device in an output mode corresponding to the communication protocol used by the selected output destination.

11. The non-transitory computer-readable storage medium storing an information distribution program of claim 10, wherein the selecting includes, using the read security level information, selecting, from the output destinations represented by the read plural sets of output destination information, an output document device, at a respective one of the output destinations, having a highest security level that meets the confidentiality level of the distribution object document, to be the selected output document device.

12. The non-transitory computer-readable storage medium storing an information distribution program of claim 10, wherein the selecting includes selecting, from output document devices at a respective one of the output destinations having a security level that meets the confidentiality level of the distribution object document, an output document device having a highest priority precedence, as set by a user request, to be the selected output document device.

13. The non-transitory computer-readable storage medium storing an information distribution program of claim 10 wherein, the selecting includes, if there is no output document device that meets the level of confidentiality of the distribution object document, then selecting a server device to be the selected output document device, and the distributing includes, if there is no output document device that meets the level of confidentiality of the distribution object document, then distributing the distribution object document to the server device to be viewable thereat, and distributing viewing destination information representing a location where the distributed distribution object document can be viewed to the one of the distribution destinations represented by the received distribution destination information.

14. The non-transitory computer-readable storage medium storing an information distribution program of claim 13, wherein the distributing includes, if distributing the distribution object document to the server device, distributing the distribution object document so as to be viewable in accordance with verification of password information.

15. The non-transitory computer-readable storage medium storing an information distribution program of claim 10, wherein the distributing includes distributing the distribution object document to the selected output document device in a state in which at least one of the following is added to the distribution object document:

if information represented by the distribution object document is being copied, notification destination information representing a notification destination to which information notifying that the copying execution is sent; and registration destination information representing a registration destination for history information that represents a history of the copying.

16. The non-transitory computer-readable storage medium storing an information distribution program of claim 10, wherein the confidentiality level information is inputted by a user.

17. The non-transitory computer-readable storage medium storing an information distribution program of claim 10, wherein the confidentiality level information is added to the distribution object document.

18. The information distribution device of claim 1, wherein the output modes include two or more of: e-mail, facsimile, print, and a confidential box for storing an electronic file.

19. The information distribution method of claim 9, wherein the output modes include two or more of: e-mail, facsimile, print, and a confidential box for storing an electronic file.

20. The non-transitory computer-readable storage medium of claim 10, wherein the output modes include two or more of: e-mail, facsimile, print, and a confidential box for storing an electronic file.

* * * * *